May 28, 1940.  L. C. BROECKER  2,202,185
VALVE CAP
Filed June 10, 1938
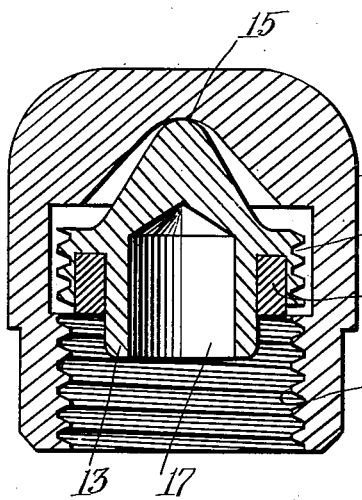
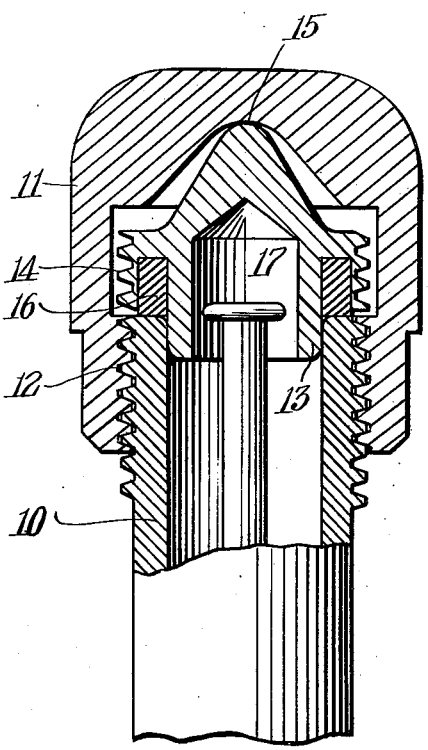
INVENTOR.
Lewis C. Broecker
BY
Kenyon & Kenyon
ATTORNEYS Patented May 28, 1940

2,202,185

UNITED STATES PATENT OFFICE 2,202,185

VALVE CAP

Lewis C. Broecker, Bridgeport, Conn., assignor to Bridgeport Brass Company, Bridgeport, Conn., a corporation of Connecticut Application June 10, 1938, Serial No. 212,961

2 Claims. (Cl. 138—89.3)

This invention relates to valve caps and more especially to valve caps for use on the stems of tires for high-speed motor buses and trucks. Due to the high temperatures encountered in the tires of high-speed motor buses and trucks, the conventional valve caps and rubber seal are proving unsatisfactory due to deterioration of the rubber as a result of the high temperatures.

An object of this invention is to provide a valve cap for such tires having a soft metal seal that will not be affected by the heat encountered in such tires.

In order to seal properly and retain its sealing qualities for a long period of time, the tire valve cap of this invention is so designed that the relatively soft sealing member can swivel with respect to the body of the cap. Also, the design is such that when the cap is applied to a valve stem, the sealing member is pressed against the end of the valve stem substantially in a straight line and with little, if any, tendency to rotate with respect to the stem.

Other objects, novel features and advantages of this invention will become apparent from the following specification and accompanying drawing, wherein:

Fig. 1 is a sectional view of a cap embodying the invention, and

Fig. 2 is a sectional view through a valve stem equipped with such a cap.

In the drawing, 10 is a valve stem of standard construction and 11 is the body of the valve cap which is suitably recessed and provided with internal threads 12 of a size suitable to be screwed on to the valve stem 10.

The threads 12 terminate short of the bottom of the recess and in the recess is arranged a seal holder 13 having threads 14 by which it may be screwed into and through the threads 12 in the position shown. The seal holder 13 is provided with a conical end 15 which contacts with the bottom of the recess in the body 11. Since the overall diameter of the unthreaded portion of the recess is slightly larger than the overall diameter of the threads 14, the holder 13 is free to swivel with respect to the body 11. In a groove in the holder 13 is provided a sealing ring or washer 16 of a soft metal such as lead, tin or copper. The cap body 11 is preferably made hexagonal or octagonal to permit the use of a small wrench or pliers for screwing it on and off from the stem 10. The holder 13 is provided with a bore 17 which provides clearance for the center pin of the valve core. The provision of the conical end 15 for the seal holder 13 permits the valve body 11 to turn on it with minor resistance while the washer 16 is being pressed against the end of the valve stem 10 when the cap is screwed on to the stem, thus causing substantially rectilinear movement of the holder into sealing position. Also, this same arrangement permits slight pivotal movement of the holder relative to the cap to facilitate movement of the holder into sealing relation to the same.

It is of course understood that various modifications may be made in the above described cap structure without in anyway departing from the spirit of the invention as defined in the appended claims.

I claim:

1. A valve cap comprising a fixed-size body portion having a tapered bottom recess threaded over a portion of its length for attachment to a stem, the remainder of said recess being of larger diameter than said threaded portion, a holder in said larger diameter portion exteriorly threaded to screw through said threaded portion and having an annular groove in its side wall adjacent the exterior threads, and a soft metal ring supported by said holder in said annular groove for engagement with the end of said stem, said holder being of less cross-section than the larger diameter portion of said recess and having a conical portion, the tip of which contacts the tapered bottom of said recess to mount said holder for rocking movement.

2. A valve cap comprising a fixed-size body portion having a recess threaded over a portion of its length for attachment to a valve stem, the remainder of said recess above the threaded portion being of larger diameter than said threaded portion, and the bottom of said recess being concave, a holder in said larger diametered portion of said recess, said holder being so admeasured and exteriorly threaded in a portion thereof to screw through said threaded portion of said body portion and having an annular groove extending longitudinally in its side wall adjacent said exteriorly threaded portion, and a soft metal sealing ring supported by said holder in said groove for engagement with the end of the stem, said holder having a conical portion, the tip of which contacts the concave bottom of said recess to mount said holder for rocking movement.

LEWIS C. BROECKER.